United States Patent [19]

Johnson

[11] 4,009,612

[45] Mar. 1, 1977

[54] WHEEL BALANCER

[76] Inventor: James A. Johnson, 59 Ocean House Road, Cape Elizabeth, Maine 04107

[22] Filed: Nov. 24, 1975

[21] Appl. No.: 634,931

[52] U.S. Cl. .............................................. 73/480
[51] Int. Cl.² .................................... G01M 1/12
[58] Field of Search ............ 73/480, 481, 66, 487

[56] References Cited

UNITED STATES PATENTS 736,096   8/1903   Heise ................................ 73/480
1,003,753   9/1911   Jost .................................... 73/480

*Primary Examiner*—James J. Gill

[57] ABSTRACT

A wheel balancer has a support by which a wheel may be rotatably held by bearing units to be free to turn until it comes to rest with its heavy point lowermost. The wheel supporting shaft, the bearing units and the supports therefor provide mechanical advantage to unbalancing weight distributions.

5 Claims, 8 Drawing Figures

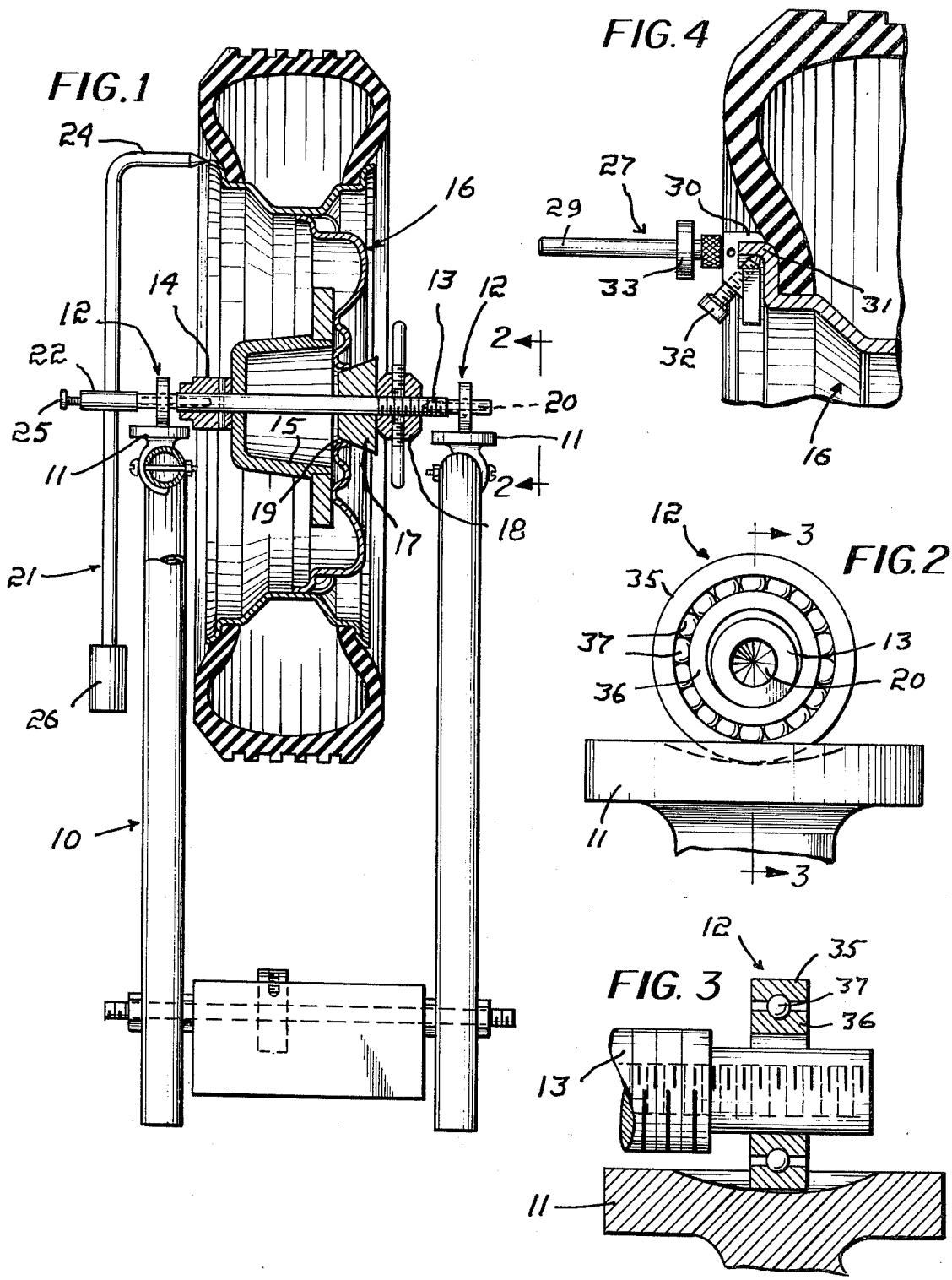

WHEEL BALANCER

BACKGROUND REFERENCES

U.S. Pat. No. 3,177,725

BACKGROUND OF THE INVENTION

Whether or not a circular member is balanced relative to its axis of rotation may be established by supporting it with an axial shaft held horizontally with its ends or roller bearing units in suitable supports. A circular member thus mounted and free to turn comes to rest with its heavy point, if there be such, lowermost. The circular member may then be balanced by the addition of weights thereto until, when free to turn, it remains motionless.

Motor vehicle wheels are a common example of rotatable members that require balancing and reference is made to U.S. Pat. No. 3,177,725 in which a wheel balancing procedure is detailed together with means enabling that procedure to be easily and quickly carried out.

THE PRESENT INVENTION

While the present invention is adapted for use in balancing any circular rotatable member relative to its axis of rotation, it is herein discussed primarily with reference to its use in balancing wheels, particularly automobile wheels with tires mounted thereon.

It is obvious that the greater the unbalancing weight factor of a wheel, the more certain it is that it will turn until it comes to rest, heavy point lowermost. Precision balancing, however, requires, particularly when the wheel or other member is to be rotated at high speed, that the wheel being balanced will turn in response to small unbalancing weight factors, the smaller the weight factor that will cause the wheel to turn until it comes to rest, the more perfect the balancing that can then be effected.

The principal objective of the present invention is to provide a balancer in which the wheel supporting shaft, the bearing units and the supports therefor provide mechanical advantage to unbalancing weight factors ensuring sensitivity to small unbalancing weight factors and that any unbalancing weight factors will reach the lowest possible position when the wheel is coming to rest with short turns in one direction or the other.

In accordance with the invention, this objective is attained with a balancer having spaced support members and bearing units of a type having inner and outer races and a series of rotatable members confined between them with one race of each unit held by the appropriate one of the support members, and a shaft member the ends of which are supported by the other bearing races. The shaft member may be integral with the circular member being balanced or it may be, as is the case with vehicle wheels, a shaft provided with means by which the wheel may be coaxially secured thereto. The diameter of the member within the inner race is less than that of the inner race with the assembly providing mechanical advantage, functioning in a manner analogous to a planetary system. In the preferred embodiment, the shaft member is supported by the inner races of the bearing units and it is also preferred that the support members be arcuate and of a radius greater than that of the outer bearing races.

BRIEF DESCRIPTION OF THE DRAWINGS

In the accompanying drawings, a preferred embodiment of the invention is illustrated and FIG. 1 is a vertical cross section of an automobile wheel and a supporting stand therefor in accordance with the invention;

FIG. 2 is a view, on an increase in scale taken approximately along the indicated line 2—2 of FIG. 1;

FIG. 3 is a section taken approximately along the indicated line 3—3 of FIG. 2;

FIG. 4 is a fragmentary cross section of the wheel with a weight receiving attachment secured to the rim at one side thereof;

THE PREFERRED EMBODIMENT OF THE INVENTION

Figure 5:
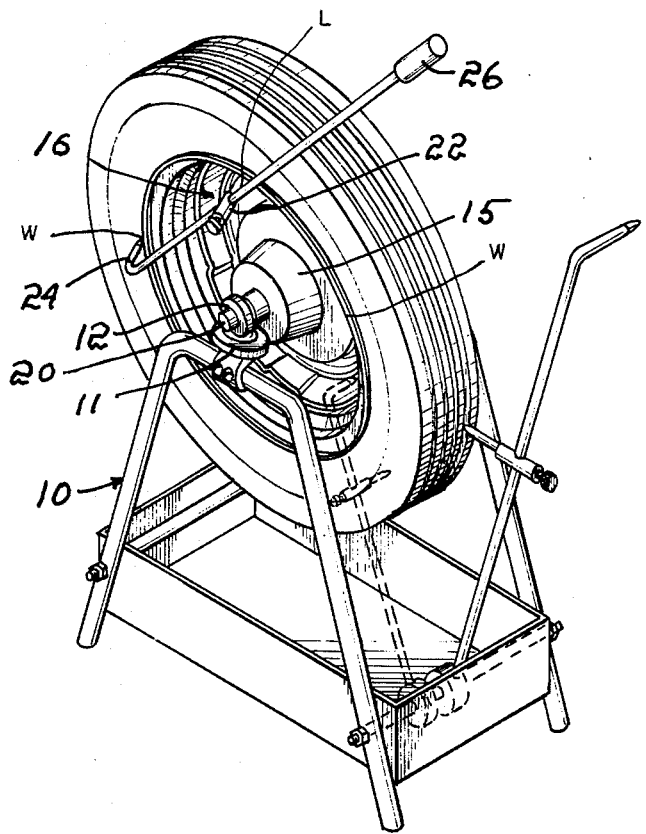
FIG. 5 is a perspective view of the wheel and the stand shown in FIG. 1, illustrating the location of a pair of weight attaching points each spaced 60° from the light point of the wheel by means of a measuring instrument and the testing of the wheel by that instrument for lateral and radial deviations.
Figure 6:
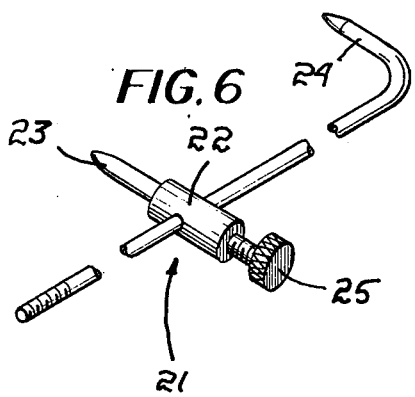
FIG. 6 is a perspective view of the instrument.
Figure 7:
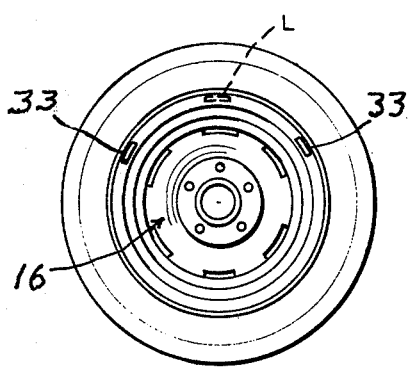
FIG. 7 is a view of the inside of a balancing wheel.
Figure 8:
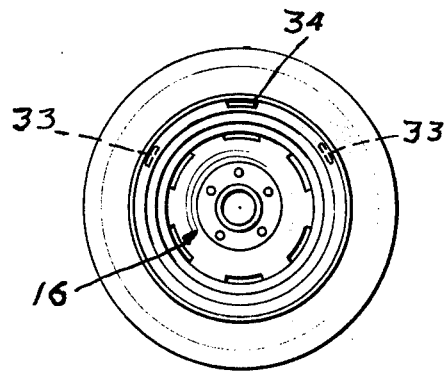
FIG. 8 is a like view of the outside of that wheel.

As previously stated, a major field of use of the invention is that of balancing automobile wheels and the preferred embodiment thereof is a wheel balancer in accordance with U.S. Pat. No. 3,177,725 but incorporating the present invention.

Such a wheel balancer includes a stand generally indicated at 10 and provided with a pair of transversely aligned, cup-shaped arcuate seats or saddles 11 for bearing units, generally indicated at 12 and in support of a shaft 13.

The shaft 13 has a sleeve 14 fixed thereon which serves as a backer for the flanged hub 15 against which a wheel 16 is coaxially clamped by means of a frustroconical member 17 when the nut 18 threaded on the shaft 13 is suitably advanced with the smaller end of the member 17 entrant of the axial hole 19 in the wheel 16.

With the wheel 16 thus separated, it is free to turn until it comes to rest with its heavy point H lowermost and the diametrically opposed portion is its light point L. The ends of the shaft 13 have axial sockets 20 and a tool, generally indicated at 21, has a hub 22 including an axial rod 23 dimensioned for entry into either socket 20. A scriber 24 extends transversely through the hub 22 and is locked in a selected position relative thereto by a locking screw 25 in which the scriber point is spaced from the axis of the shaft 13 by a distance representing the radius of the wheel 16. A counterweight 26 is threaded on the end of the scriber 24. With the rod 23 of the tool 21 within a shaft socket 20, the light point L is easily and accurately located.

In counterbalancing the heavy point H, an attachment, generally indicated at 27 is used. The attachment 27 includes a support 28 for a rod 29, a jaw 30 for engagement with the outer surface of the wheel rim 31 and a locking screw 32 threaded through the head for locking engagement with the inner surface of the rim 31. One or more weights 33 are slidably supported by the rod 29 until the combined weight of the attachment and the weight or weights carried thereby counterbalance the heavy point H.

The balancing weight is then divided into two equal parts and two weights 33, each as near as possible to the quotient of the balancing weight are caught on the rim flange 31, preferably on the inside of the wheel, at points spaced 60° from the light point L and 120° from each other as by centering the rod 23 of the scriber 24 on the light point L and swinging the scriber through an arc with the desired points for weight attachment found where the rim flange is intersected.

Balancing is completed by the addition of a third weight 34 to the outside of the wheel 16 at a point transversely aligned with the light point L which point may be determined in the same manner. The weight added as the final step to the outside of the wheel is equal to the counterbalancing weight, in practice, the closest approximation thereto that is possible with the set of weights available. Desirably, the wheel is then again tested for balance. Weights of the correct values thus located on appropriate sides of the wheel function to dampen effectively any lateral vibrations.

The wheel is now properly balanced and the wheel balancer as thus far described is generally similar to and may be identical to that set forth in said U.S. Pat. No. 3,177,725.

It will be appreciated that the accuracy of the balancing operation depends on the freedom with which the wheel turns for slight imbalances may cause slow or no turning in response thereto and even with a substantial imbalance, a wheel may come to rest with the heavy point H close to but not in the lowest possible position. The present invention is concerned with that problem and, in general, solves it by providing mechanical advantages to unbalancing weight factors through the medium of the bearing units 12.

The bearing units 12 are or may be conventional and of the type having an outer race 35, an inner race 36, and a series of rotatable members 37, balls or rollers, confined therebetween. The inner races 36 are dimensioned to be a loose fit on the ends of the shaft 13 which are desirably reduced in diameter as at 13A and the outer races 35 are held by the cup-shaped seats 11 which are arcuate with a radius greater than that of the outer races 35 thereby ensuring that they roll into a centered position providing a self-aligning feature since the outer races 35 roll into centered positions thereon.

With such a seat-to-shaft relationship, mechanical advantages are provided ensuring adequate sensitivity since with the outer race 35 held and the inner race free to turn in response to the turning of the shaft 13, the functioning of the ball bearing units may be likened to a planetary system with the balls, the planetary gears and the inner race 36, the carrier therefor.

I claim:

1. A device for use in supporting a circular member to determine whether it is balanced relative to its axis of rotation as defined by an axial shaft member extending from both sides of the circular member, spaced support members, each having an upwardly opening arcuate seat, and bearing units for each end of the axial member and of the type including inner and outer races and a series of rotatable members rotatably confined therebetween, the radius of each seat greater than that of each outer race, the outer race of each unit resting on and centered by the appropriate one of said seats and held against turning by the weight of the circular shaft members and the other race member of each unit free to turn as the axial member turns in response to any unbalancing weight distribution of the circular member, each shaft member end supported by a corresponding one of the inner races, and the diameter of each inner race greater than the diameter of the ends of the member it supports.

2. The device of claim 1 in which the seats are concave.

3. A device for use in supporting a circular member to determine whether it is balanced relative to its axis of rotation, said device including a shaft member, means to clamp such a member to said shaft member between its ends with the shaft and member axes coinciding, spaced support members each having an upwardly opening arcuate seat, and bearing units for each end of the axial member and of the type including inner and outer races and a series of rotatable members rotatably confined therebetween the radius of each seat greater than that of each outer race, the outer race of each unit resting on and centered by the appropriate one of said seats and held against turning by the weight of the circular and shaft members and the other race of each unit free to turn as the axial member turns in response to any unbalancing weight distribution of the circular member, each shaft member end supported by an appropriate one of the inner races, and the diameter of each inner race greater than the diameter of the end of the shaft member it supports.

4. The device of claim 3 in which the seats are concave.

5. The device of claim 3 in which the circular member is an automobile wheel.

* * * * *